United States Patent [19]

Bortnick et al.

[11] Patent Number: 4,962,165

[45] Date of Patent: Oct. 9, 1990

[54] PROCESS FOR MAKING SILICONE PARTICLES

[75] Inventors: Newman M. Bortnick, Oreland; Long-Jin Lin, Holland, both of Pa.

[73] Assignee: Rohm and Haas Company, Philadelphia, Pa.

[21] Appl. No.: 296,256

[22] Filed: Jan. 12, 1989

[51] Int. Cl.$^5$ ............................................. C08F 283/00
[52] U.S. Cl. ...................................... 525/479; 526/279
[58] Field of Search ......................... 525/479; 526/279

[56] References Cited

U.S. PATENT DOCUMENTS

| | | | |
|---|---|---|---|
| 4,113,687 | 9/1978 | Ugelstad | 260/29.6 |
| 4,617,238 | 10/1986 | Crivello et al. | 525/479 |
| 4,742,142 | 5/1988 | Shimizue et al. | 528/15 |
| 4,743,667 | 5/1988 | Mizutani et al. | 526/279 |
| 4,743,670 | 5/1988 | Yoshida et al. | 528/15 |
| 4,761,454 | 8/1988 | Oba et al. | 524/862 |

FOREIGN PATENT DOCUMENTS

| | | |
|---|---|---|
| 0252510 | 9/1987 | European Pat. Off. . |
| 6081227 | 10/1983 | Japan . |
| 257939 | 11/1987 | Japan . |

OTHER PUBLICATIONS

*Silicone Rubber in Powder Form*, Swanson, Leicht & Wegener, Amer. Chemical Society, Rubber Div. Oct. 1974.

Platinum–Catalyzed Hydrosilylation–Colloid Formation as the Essential Step, by H. L. Lewis & N. Lewis, J., Amer. Chem. Society, 108, 7228 (1986).

J. Ungelstad, M. S. El-Asser & J. W. Vanderhoff, *Emulsion Polymerization of Polymerization in Monomer Droplets.*Polymer Letters, 11, 503 (1973).

K. L. Hoy, *Table of Solubilize Parameters*, Union Carbide Corp., Jul. 1969.

*Primary Examiner*—Melvyn I. Marquis

[57] ABSTRACT

An improved process for manufacturing silicone-containing polymer particles is provided. The process is particularly useful for preparing uniform, crosslinked silicone rubber particles of controlled particle size distribution and submicron size. In another embodiment, the process can be used to modify the surface properties of silicone-containing polymers to improve their compatibility with and dispersion into other polymers.

20 Claims, No Drawings

PROCESS FOR MAKING SILICONE PARTICLES

FIELD OF THE INVENTION

This invention is directed to an improved method for producing silicone-containing polymers. More particularly, the invention is directed to a suspension polymerization process for preparing spherical, crosslinked silicone-containing copolymer particles of predominantly submicron size with a controlled particle size distribution. In addition, the process may also include the modification of the silicone-containing co to improve their compatibility with and dispersability in other polymeric materials as by copolymerization of the silicone-containing copolymers with a reactive surfactant or by partially or completely coating or encapsulating the silicone-containing copolymers with one or more compatabilizing polymers.

BACKGROUND OF THE INVENTION

Crosslinked silicone rubber particles possess a number of desirable chemical and physical properties including, for example, good thermal stability, elasticity, water resistance, and lubrication assistance. Because of these properties, silicone rubber particles have been proposed for a variety of applications, such as for example, impact strength improvers, low temperature flexibilizers, and processing aids for molding materials, laminates and rubber-modified plastics. Despite these beneficial properties, silicone-containing polymers possess significantly different chemical and thermodynamic properties from the other materials to which they would advantageously be intended to be added. These differences may result in compatability and dispersion problems on such application.

Methods for making crosslinked silicone rubber particles are known. Traditionally, these particles have been made commercially by grinding or cryogenically fracturing crosslinked silicone rubber, such as crosslinked silicone rubber sheets, into powder form. See Japanese Kokai JP 60-81, 227 *Powdered Granular Silicone;* Soviet Union Patent No. 952895 and *Silicone Rubber in Powder Form,* Swanson, Leicht and Wegener, American Chemical Society, Rubber Division, October 1974.

These conventional techniques possess a number of drawbacks. In addition to the expense of such techniques, which makes the particles so produced too costly for many potentially attractive commercial applications, these techniques produce a less than optimum yield of irregularly shaped particles having a wide and relatively uncontrolled range of particle sizes. It has thus become an object of workers in this art to develop more efficient and less expensive means for making crosslinked silicone rubber particles of uniform spherical shape, small particle size and narrow particle size distribution.

DESCRIPTION OF THE PRIOR ART

U.S. Pat. No. 4,742,142 *Method of Producing Silicone Rubber Powder* describes a method for making small silicone rubber powders of uniform shape without grinding or cryofracturing. The process employs a curable liquid silicone rubber composition containing a liquid, reactive-group-containing organopolysiloxane with at least two lower alkenyl radicals bound to each silicone, an organopolysiloxane crosslinker containing at least two silicon-bonded hydrogen atoms per molecule, and either a platinum group metal curing catalyst, or, in the case where the organopolysiloxane contains at least two vinyl radicals per molecule, an organoperoxide free radical initiator. These ingredients are blended together at a temperature of from minus 60° C. to plus 5° C., preferably from minus 30° C. to 0° C., to prevent the mixture from curing prematurely. The mixture is then emulsified by blending with water and a surfactant at a temperature of from 0° C. to 25° C. This temperature range was selected to be above the freezing point of water and below the curing temperature (25° C.) of the silicone rubber. The emulsion is then cured by dispersing it into water, preferably in an amount equal to at least twice the total quantity of the emulsion to be dispersed, at a temperature of at least 25° C. Illustrative examples demonstrate the curing step, using water at 40° C. and 80° C., followed by isolating the powder, by washing and drying, to produce spherical crosslinked rubber particles of about 10 and 20 microns, respectively.

European Patent Application Publication No. 025510 *Method for Producing Silicone Rubber Powder.* involves blending a curable liquid silicone rubber composition at a temperature of from minus 60° C. to plus 5° C., maintaining the mixture at this temperature, and then spraying the mixture into hot air, at a temperature of from 80° C. to 200° C., to cure the composition. The curable liquid composition contains an organopolysiloxane having at least two lower alkenyl radicals per molecule, an organo-hydrogen polysiloxane having at least two silicon-bonded hydrogen atoms per molecule, and a platinum group metal catalyst. The technique is disclosed as being capable of producing spherical crosslinked silicone rubber particles with diameters in the range of several hundred microns to several hundred millimicrons.

Japanese Patent Application JP62-257939 discloses making silicone rubber particles having particle sizes below 20 microns. These particles are made by a process similar to that disclosed in U.S. Pat. No. 4742142 using spray drying to isolate the cured silicone rubber particles.

Japanese Patent Application No. JP60-081227 is directed to a process for preparing silicone rubber powder by dissolving a gel prepared by hydrolyzing organohalogenated silanes in an alkali aqueous solution, adding an organometallic crosslinking agent, adding an acidifying agent, effecting polycondensation and isolating the product.

U.S. Pat. No. 4743670 *Method for Producing Silicone Rubber Powder* is also directed to a method for producing silicone rubber powder and especially to such powders having a specific resistivity suitable for use as an electrical insulating material. This method involves preparing a heat-curable, liquid silicone rubber dispersion in water at a temperature of from 0° C. to 25° C. This dispersion is distinguished from the aforementioned techniques by the absence of a surfactant. The surfactant free dispersion is then dispersed into water at a temperature of at least 50° C. to cure the silicone rubber composition.

Large scale commercial production of silicone rubber particles which requires maintaining a dispersion of a curable liquid organopolysiloxane at low temperatures, such as for example below 25° C., to prevent premature curing may be a significant disadvantage. It would be more advantageous to be able to prepare cured silicone polymer particles without the need for such low temperature processing.

In addition to this drawback, the prior art techniques suffer from an inability to produce crosslinked silicone rubber particles of controlled submicron size and narrow particle size distribution. The ability to produce crosslinked silicone rubber particles which are not only uniformly spherical in shape, but which are of a controlled and narrow submicron particle size could also permit such particles to find new applications as in coatings, adhesives, textiles, caulks and the like ,as well as in improved molding compounds .

Crosslinked silicone rubber particles possess different free energy characteristics as compared with most of the polymeric compositions to which they may be intended to be added, such as for example, in thermoplastics and thermosetting resins of the epoxy novolac type and the like. Accordingly, it would be additionally beneficial if a process which produces uniformly spherical silicone-containing polymer particles of controlled size and distribution could also be modified to improve their dispersability in, or compatibility with such other polymers to which they are intended to be added.

It is therefore an object of the invention to provide an improved method for making silicone-containing polymer particles of spherical shape.

It is an additional object of the invention to prepare crosslinked silicone rubber particles of spherical shape having controlled submicron size and narrow particle size distribution.

It is a further object of the invention to prepare silicone-containing polymer particles with modified surface properties to improve their dispersion in, and compatibility with, other polymeric materials.

SUMMARY OF THE INVENTION

An improved process for preparing silicone-containing polymer particles of spherical shape, controlled particle size distribution and submicron size is provided. The process requires the preparation of a functionalized siloxane-containing material containing at least one, and preferably at least two copolymerizable, and preferably free radical initiatable, functional groups per siloxane chain. The functionalized siloxane-containing material, containing at least two such functional groups, preferably being a functionalized silicone oligomer, may then be suspension polymerized to form crosslinked silicone rubber polymer particles. The functionalized siloxane-containing material may alternatively be polymerized to form noncrosslinked polymers suitable for use in film-forming compositions, such as coatings.

The use of selected solvents during the suspension polymerization is effective for producing controlled, submicron size, silicone polymer particles. The functionalized siloxane-containing material may alternatively be copolymerized with reactive surfactants by suspension polymerization or coated or encapsulated with other copolymerizable unsaturated monomers, as by an emulsion polymerization reaction after the silicone-containing material has been crosslinked ,to modify the surface properties of the siloxane-containing material.

DETAILED DESCRIPTION OF THE INVENTION

We have developed a versatile method for preparing silicone-containing polymer particles, including, but not limited to, spherical crosslinked silicone rubber particles of controlled particle size distribution and submicron size.

This process requires as a first step the functionalization of an organohydrosiloxane material with a multifunctional unsaturated monomer.

The organohydrosiloxane material must contain at least one, and preferably, in the case where crosslinked silicone-containing particles are desired, at least two reactive Si—H bonds per molecule or chain. The multifunctional unsaturated monomer must be one which is reactive with the reactive Si—H bonds on the organohydrosiloxane while maintaining an ability for copolymerization, as by a free radical initiated reaction, with itself or other copolymerizable unsaturated monomers.

The organohydrosiloxane material should be a liquid at room temperature and possess a low enough viscosity and molecular weight to be easily handled. In this regard, we have found a preference for completely random, room temperature liquid, organohydrosiloxane oligomers having at least one, and preferably at least two, reactive Si—H bonds per chain, and more preferably a sufficient number of diorganic siloxane units to provide the resulting silicone-containing polymer with elasticity.

These preferred organohydrosiloxane oligomers are known in the art and may be prepared by any of a number of conventional synthesis routes. The organohydrosiloxane, also referred to as diorganosiloxane-co-organohydrosiloxane, is a random copolymer or oligomer having the following structural formula (I):

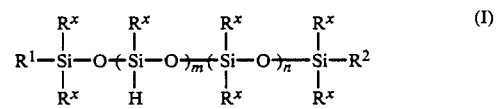

where $R^1$ and $R^2$ may independently be hydrogen, alkyl or aryl, and $R^x$ may be either alkyl or aryl ,and where each $R^x$ may be different from one another.

In the preferred embodiment of the present invention where a crosslinked silicone-containing polymer is desired, the organohydrosiloxane oligomer (I) must contain at least two Si—H bonds per chain. These Si—H bonds may be: the terminal Si—$R^1$ or Si—$R^2$ units, as when either or both $R^1$ and $R^2$ are hydrogen; the internal units, or a combination thereof.

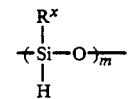

In cases where both $R^1$ and $R^2$ are both hydrogen, m can be zero, but when both $R^1$ and $R^2$ are not hydrogen, m must be at least two. If either, but not both, $R^1$ or $R^2$ are hydrogen, m must be at least one for preparing a crosslinked silicone-containing polymer according to the invention. Hereinafter, we shall refer to such organohydrosiloxanes containing a total of at least two reactive Si—H bonds per chain as multihydrosiloxanes, and those containing only one reactive Si—H bond per chain as monohydrosiloxanes.

The number of diorganosiloxane, or n, units in the organohydrosiloxane(1) chain determines the degree of elasticity of the resulting silicone-containing polymer as well as contributing to the overall molecular weight, viscosity and handle-ability of the starting reactant. In cases where the organohydrosiloxane is intended solely to impart some silicone properties to a copolymer, but not primarily elasticity, as in the case where the copolymer is formed from a predominant amount of one or more other copolymerizable monomers, the organohydrosiloxane does not necessarily require the presence of any diorganosiloxane units, and therefore, can be zero. We have found, however, that the number of n units should preferably be in the range of from about 4 to about 400, such that the weight average molecular weight of the organosiloxane oligomer(1) is in the range of from about 500 to about 30,000. If the weight average molecular weight of the organohydrosiloxane is greater than about 30,000, the viscosity of the liquid oligomer becomes too high to be handled easily and is, therefore, not preferred. As the number of n units is increased within the above-range, the elasticity of the silicone-containing polymer increases and the resulting polymer possesses such elasticity that it may be referred to as a "silicone rubber".

As stated above, the organohydrosiloxane must contain at least two reactive Si—H bonds per chain to be crosslinkable after functionalization. When silicone rubber particles with loose networks are desired, the number of reactive Si—H bonds per organohydrosiloxane molecule or chain should be low, but still at least one, and preferably at least two for crosslinking. A loose network or low crosslink density refers to the molecular weight of the portion of the silicone-containing material between each Si—H crosslink site. The higher the molecular weight between each reactive Si—H crosslink site the looser the rubber network. In order to form crosslinked rubbers which can be isolated as free flowing, non-aggregated powders, the number of reactive Si—H bonds per organohydrosiloxane oligomer chain should preferably be greater than one thirtieth of the total silicone units in the chain. In the alternative, an additional crosslinking comonomer can be employed during the functionalization or subsequent crosslinking reaction to improve the efficiency of the crosslinking process in the siloxane copolymer particles.

The reactive Si—H bonds of the organohydrosiloxane are functionalized by a reaction with a multifunctional unsaturated monomer, preferably containing double bonds with different reactivity towards the Si—H bond in the organohydrosiloxane, in the presence of a hydrosilylation catalyst, such as for example a platinum group metal-containing catalyst. This reaction is believed to proceed by the formation of a organohydrosiloxane-platinum group metal complex, the removal (hydrosilylation) of the reactive hydrogen atom from the silicon atom, and the attachment of the multifunctional unsaturated monomer to the silicon atom. The reaction is conducted at temperatures in the range of from about 25° C. to about 60° C., utilizing from about 5 to about 500 parts per million (ppm), and preferably from about 10 to 50 ppm, of the hydrosilylation catalyst. The chemistry of hydrosilylation reactions using platinum group metal catalysts is described in more detail in *Platinum-catalyzed Hydrosilylation-Colloid Formation as the Essential Step* N. L. Lewis and N. Lewis, J. Am. Chem. Soc. 108, 7228 (1986).

Any of a number of multifunctional unsaturated monomers, which will maintain a copolymerizable group, preferably a free radical initiatable group, after the functionalization reaction, may be employed in the functionalization with the organohydrosiloxane. Examples of suitable multifunctional unsaturated monomers include alkenyl and cycloalkenyl (meth)acrylates, maleates, fumarates, and the like. In order to properly functionalize at least two Si—H bonds per chain on the multihydrosiloxane, for preparing a crosslinked silicone-containing polymer, at least an equal molar equivalent, and preferably an excess, of the multifunctional unsaturated monomer should be used. In other words, the functionalization reaction should employ at least m equivalents (m referring in this case to both $(Si-H)_m$ units of structural formula (I) plus $R^1$ and $R^2$ hydrogens) of the multifunctional unsaturated monomer. We have found a preference for highly reactive multifunctional unsaturated monomers containing allyl groups, and most preferably for allyl methacrylate, as the multifunctional unsaturated monomer.

The functionalized organosiloxane formed from the organohydrosiloxane oligomer of formula I using allyl methacrylate as the multifunctional unsaturated monomer may be represented by structural formula II:

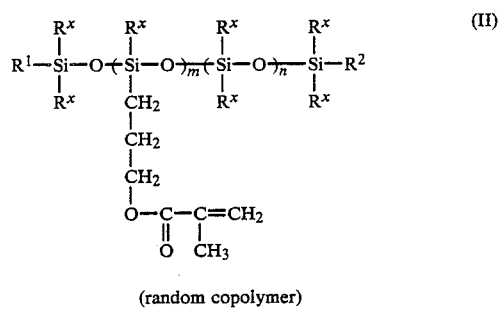

(random copolymer)

where $R^1$ and $R^2$ may independently be alkyl or aryl (when $R^1$ or $R^2$ were alkyl or aryl in structured formula I), or methacryloxypropyl (when $R^1$ or $R^2$ were hydrogen in structural formula I).

If non-crosslinked or loose network silicone-containing polymers are desired, the reactive Si—H bonds may be functionalized with y equivalents of multi-functional unsaturated monomer, where y is less than 2, and (m-y) equivalents of a monofunctional unsaturated monomer, such as for example an alkene, alkyl acrylate, styrene and the like.

The functionalized organosiloxane formed from the organohydrosiloxane of formula I using y, where y is less than 2, equivalents of allyl methacrylate as the multifunctional unsaturated monomer, and (m-y) equivalents of monofunctional monomer may be represented by structural formula III.

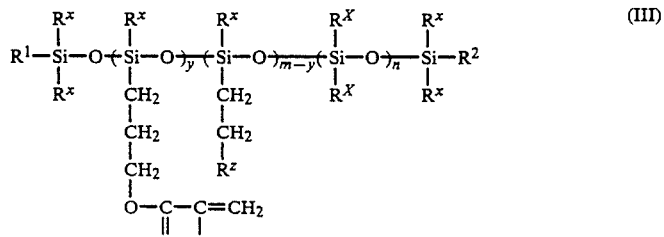

(random copolymer)

where $R^1$ and $R^2$ may independently be alkyl or aryl (when $R^1$ or $R^2$ were alkyl or aryl in structural formula I) or methacryloxypropyl (when $R^1$ or $R^2$ were hydrogen in structural formula II), and $R^z$ may be alkyl, aryl or carboxyalkyl such as for example lower alkyl acrylates.

The second step in the process of the invention involves the polymerization, preferably the free radical initiated polymerization, of the functionalized organosiloxane formed during the first step. This step may also involve the copolymerization of the functionalized organohydrosiloxane with unsaturated crosslinking co-monomers, such as for example, allyl methacrylate, allyl acrylate, divinylbenzene, trimethylolpropane trimethacrylate and the like, to aid in the crosslinking of the functionalized organosiloxane chains of structural formula II. These unsaturated crosslinking monomers may be employed at concentrations of from as low as zero up to about 20 weight percent on the weight of total polymerizable material. Higher concentrations can be used, but are not believed to be beneficial as it would reduce the elasticity of the particles.

Other copolymerizable monomers may also be utilized in the second step of the process to impart additional properties to the functionalized organosiloxane. These monomers include copolymerizable alpha, beta-ethylenically unsaturated monomers, such as for example, acrylates and methacrylates, styrene, and the like, at concentrations of from 0 weight percent to 99 weight percent on the weight of the total polymerizable material.

The second step is preferably conducted in an emulsion formed by homogenizing, or otherwise emulsifying, the functionalized organosiloxane with a surfactant, free radical initiator, and water at ambient temperatures such as for example in the range of from about 20° C. to about 60° C. Homogenization or emulsifying this mixture is required to form organosiloxane droplets, and resulting siloxane polymer particles, with average particle size diameters in the range of submicron to about 15 microns.

The surfactants which can be used may be any of the ionic surfactants, nonionic surfactants, or combinations thereof which are conventionally used for making silicone-containing emulsions. Examples of suitable ionic surfactants include ammonium nonylphenoxy-poly(ethyleneoxy)ethyl sulfate, sodium dodecylbenzenesulfonate (Siponate® DS-4), and sodium lauryl sulfate. Examples of suitable nonionic surfactants include silicone glycol copolymers and polyalkyleneoxide modified silicones.

When the functionalized organosiloxane is to be crosslinked by suspension polymerization, any oil soluble free radical initiator having a ten hour half-life below 100° C may be used. Examples of suitable initiators include azo compounds, such as for example, Vazo® 52, 64 or 67 or peroxyesters, such as for example, Lupersol® 546, 554, 575, or 588, and the like.

If at this point in the process the functionalized organosiloxane is to be copolymerized with a predominant amount of unsaturated monomers by an emulsion polymerization reaction, water soluble initiators such as ammonium persulfate, sodium persulfate or potassium persulfate may be used.

Redox initiators, such as for example, tertiary-amyl hydroperoxide or tertiary-butyl hydroperoxide(t-BHP) as the oxidant with sodium formaldehydesulfoxylate(SFS) or isoascorbic acid(IAA) as the reductant, may be used as the initiator system for either suspension or emulsion polymerization of the functionalized organosiloxane.

When noncrosslinked functionalized siloxane polymers are desired to be employed, as for example for use in a film-forming latex paint formulation, the polymerization reaction may be conducted by homogenizing a monomer emulsion containing, preferably a predominant amount of, at least one monofunctional unsaturated monomer, such as for example butyl (meth)acrylate, methyl (meth)acrylate, and methacrylic acid, with an ionic surfactant, such as for example sodium dodecylbenzene sulfonate, deionized water, and, preferably a minor amount, on the order of about two percent by weight, of the functionalized organosiloxane, such as for example a methacrylate-functional siloxane (structural formula III where m=6, n=6, and $R^1=R^2=R^x=$methyl, functionalized with butyl acrylate and optionally with a sufficient concentration of one or more multifunctional monomers, such as for example allyl methacrylate, to yield about one methacryloxy-propyl group per polymer chain for subsequent polymerization) and other optional additives, such as for example adhesion promoters, over a period of about two hours at a temperature of about 80–85 degrees Centigrade. After the gradual addition of the reactants is completed the reaction is maintained at the reaction temperature for about one-half hour, allowed to cool, and filtered to remove coagulum, producing a polymer dispersion of non-crosslinked polymer particles having an average particle size diameter of about 275 nanometers. "Non-crosslinked" as used herein with reference to the silicone-containing polymers refers to the fact that the silicone-containing polymers have not been crosslinked to the extent otherwise necessary for the polymer to be subsequently isolated as free flowing particles, and should not be interpreted as implying that the polymers have not necessarily been crosslinked to any extent. The dispersion may then be formulated into a conventional coating formulation, such as for example a semi-gloss latex paint having 23% pigment volume concentration and about 35% volume solids. We have observed that such a formulated paint exhibits significant improvement in block resistance and dirt pickup resistance when compared to a control not containing the non-crosslinked, functionalized siloxane polymer particles. An interesting observation is that the films containing the functionalized siloxane polymer particles exhibit a higher silicone concentration on the surface than if the silicone were uniformly distributed throughout the film.

In the preferred embodiment, where crosslinked silicone rubber particles are desired, the homogenized emulsion, containing the functionalized organosiloxane, water, surfactant, initiator and copolymerizable monomer or monomers, is free radical initiated and suspension polymerized in water at a temperature of from about 65° C. to about 95° C. to crosslink the functionalized organosiloxane oligomer into particles having particle sizes in the range of submicron to about 15 microns.

We have discovered an alternate to the suspension polymerization of the homogenized emulsion in water, as described above, which permits the preparation of crosslinked silicone rubber particles having even smaller particle sizes and controlled particle size distribution, by suspension polymerization using selected cosolvents. It is difficult to cause siloxane-containing emulsions to form droplets of submicron size by conventional shearing or homogenization techniques. This difficulty is primarily the result of the higher viscosity and hydrophobic nature of silicone-containing materials relative to nonsilicone-containing monomers.

We have found that selected solvents can be used to reduce the viscosity, and adjust the free energy of the siloxane-containing droplets and assist in making submicron size particles with controlled particle size distribution. Experiments using cosolvents with low water solubility, which have been previously proposed in mini-emulsion processes described for example in J. Ugelstad, M. S. El-Aasser and J. W. Vanderhoff, *EMULSION POLYMERIZATION INITIATION OF POLYMERIZATION IN MONOMER DROPLETS*, Polymer Letters, 11, 503 (1973), such as cetyl alcohol, n-alkanes such as hexadecane, chlorododecane (U.S. Pat. No. 4,113,687), while being effective for producing miniemulsions of non-silicone-containing particles in the range of from about 100 to 400 nanometers, were not effective with the functionalized organosiloxane oligomers. We also found that other cosolvents, such as for example, toluene, methylene chloride, chloroform, methyl chloroacetate, nitromethane, methyl acetate, methyl ethyl ketone, tetrahydrofuran, acetonitrile, dioxane, N,N-dimethylformamide, ethylene glycol, acetone, butyl alcohol, amyl alcohol and butyl Cellosolve were also not effective as cosolvents or diluents. Unexpectedly, however, we did find that certain solvents did possess the necessary balance of properties needed to form stable submicron size droplets containing the functionalized organosiloxane.

These solvents must have the following characteristics:

(1) miscible with the functionalized organosiloxane, and (2) some measure of water solubility.

It may also be desirable for the solvent to have a low enough boiling point for facile isolation of the crosslinked silicone containing polymer particles as a non-agglomerated, free-flowing powder.

The preferred solvents are those having non-polar solubility parameters in the range of from about 6.3 to about 7.4; polar solubility parameters in the range of from about 3.1 to about 5.0; hydrogen bonding solubility parameters in the range of from about 1.9 to about 4.6; and a total solubility parameter of from about 7.8 to about 9.4.(See K. L. Hoy, *Table of Solubility Parameters*, Union Carbide Corporation, July 1969).

These solvents include esters, ketones and aldehydes such as for example:

| Compound | Solubility parameters polymer[1] | | | | part. size (microns) |
|---|---|---|---|---|---|
| | Nonpolar | Polar | H-Bonding | Total | |
| EtOAc | 6.55 | 4.20 | 4.346 | 8.91 | 0.1–0.5 |
| BA | 6.86 | 4.04 | 3.312 | 8.63 | 0.1–0.5 |
| EA | 6.49 | 4.55 | 3.848 | 8.81 | 0.1–0.5 |
| Methyl Isopropyl Ketone | 7.14 | 4.30 | 3.209 | 8.94 | 0.1–0.5 |
| Methyl Propyl Ketone | 7.1 | 4.27 | 3.488 | 8.99 | 0.1–0.5 |
| | 6.55–7.14 | 4.04–4.55 | 3.209–4.346 | 8.63–8.99 | 0.1–0.5 |
| Diethyl Ketone | 7.07 | 4.26 | 3.730 | 9.06 | 0.1–1.0 |
| Isopropyl Acetate | 7.01 | 4.08 | 2.786 | 8.58 | 0.1–1.0 |
| MeOPr | 6.78 | 4.32 | 4.354 | 9.14 | 0.1–1.0 |
| MMA | 6.61 | 4.93 | 4.152 | 9.23 | 0.1–1.0 |
| Methyl Isobutyl Ketone | 7.06 | 3.94 | 2.875 | 8.58 | 0.1–1.0 |
| Hexanal | 6.95 | 3.86 | 4.029 | 8.91 | 0.1–1.0 |
| Isobutyraldehyde | 6.38 | 4.40 | 4.082 | 8.76 | 0.5–1.5 |
| BuOAc | 7.09 | 3.79 | 3.298 | 8.69 | 0.5–1.5 |
| VA | 6.31 | 4.91 | 4.236 | 9.05 | 0.5–1.5 |
| MA | 6.47 | 5.00 | 4.594 | 9.38 | 0.5–1.5 |
| PrOAc | 6.87 | 3.98 | 3.816 | 8.80 | 0.5–1.5 |
| | 6.31–7.09 | 3.79–5.00 | 2.786–4.594 | 8.58–9.38 | 0.1–1.5 |
| Butyl Butyrate | 7.15 | 3.37 | 3.015 | 8.46 | 0.5–2.0 |
| Diisobutyl Ketone | 7.10 | 3.32 | 1.881 | 8.06 | 0.5–3.0 |
| Hexyl Acetate | 7.30 | 3.40 | 3.131 | 8.64 | 0.5–4.0 |
| Methyl Amyl Ketone | 7.38 | 3.73 | 3.515 | 8.98 | 0.5–4.0 |
| Hexyl Acrylate | 7.19 | 3.67 | 3.221 | 8.69 | 1.0–5.0 |
| 2-Ethylhexyl Acetate | 7.22 | 3.10 | 2.618 | 8.29 | 1.0–5.0 |
| 2-Ethylhexyl Acrylate | 6.80 | 3.32 | 2.186 | 7.87 | 1.0–5.0 |
| | 6.80–7.38 | 3.10–3.73 | 1.881–3.515 | 7.87–8.98 | 0.5–5.0 |

[1]The emulsion were prepared using 20 percent by weight siloxane and 80 percent by weight solvent. Particle size was estimated by optical microscopy.

Preferable solvents include ethyl acetate (EtOAc), propyl acetate (PrOAc), butyl acetate (BuOAc), methyl propionate (MeOPr), ethyl acrylate (EA), methyl acrylate (MA), methyl methacrylate (MMA), butyl a (BA), vinyl acetate (vA), methyl propyl ketone, methyl isopropyl ketone, diethyl ketone, hexanal and isobutyraldehyde.

Some of these solvents, such as for example, the acrylate and methacrylate monomers, are not only useful solvents for preparing submicron size crosslinked silicone-containing polymer particles, but in addition will be incorporated as additional reactive components into the product. This incorporation may be advantageous ,or not, depending on the required properties of the product. The concentration of these cosolvents can range from about 1 to about 99 weight percent, and preferably 40 to 80 weight percent, on the weight of the total organic phase. The average droplet size of the emulsion formed by homogenizing the functionalized organosiloxane in the presence of the selected cosolvent depends on the concentration of the cosolvent employed. We have found that the functionalized organosiloxane droplet sizes in the range of from about 0.5 to about 2.0 microns(See above table under column identified as particle size (microns)) can be achieved as for example by utilizing a concentration of 40 percent ethyl acetate cosolvent, while droplet sizes in the range of about 0.1 to about 1.0 micron can be achieved with 70 percent ethyl acetate, and particle sizes in the range of about 0.1 to about 0.5 microns can be achieved with 30 ethyl acetate at a concentration of 80 percent. We also found that after suspension polymerization of the functionalized organosiloxane droplets formed using such selected cosolvents, the particle size of the isolated silicone-containing copolymer particle powder had a particle size distribution ,as determined by optical microscopy, similar to that of the mini-emulsion droplets formed during homogenization using the selected cosolvent(s).

As silicone rubbers possess significantly different free energy surface properties from most polymeric matrix compositions to which they may be subsequently added to, or blended with, such as for example, thermoplastic film forming coatings and thermosetting molding compounds, we explored the potential of the process of the invention to modify the surface properties of silicone-containing polymer particles prepared by the process. We found that by combining conventional suspension and emulsion polymerization techniques it is possible to conduct sequential or staged polymerizations of monomers onto the surface of the crosslinked silicone-containing polymer particles. This sequential or staged polymerization can produce morphologies referred to in the art as core/shell, encapsulated, or partially encapsulated silicone-containing polymer rubber particles. We have found that copolymerizable monomers, such as for example, methyl methacrylate, phenyl methacrylate, styrene, methylstyrene, butyl methacrylate,2- ethylhexyl acrylate, butyl acrylate, and isobornyl methacrylate can readily be copolymerized onto the surface of the crosslinked silicone-containing polymer particles. In addition to utilizing staged polymerization to modify the surface properties of silicone-containing polymer particles, we have also found that reactive surfactants can be used. Examples of suitable reactive surfactants which may be so employed include nonylphenoxypoly(ethyleneoxy)ethyl acrylate, methoxypoly(ethyleneoxy)ethyl acrylate, and stearyloxypoly(ethyleneoxy)ethyl methacrylate of about 10 to 40 (ethyleneoxy) chain lengths. Reactive surfactants containing poly(ethyleneoxy) and poly(styryloxy) blocks have also been found to be useful. We also found that in addition to improved compatibility, the surface modified crosslinked silicone-containing polymer particles also exhibit improved dispersion into polymer matrices, such as for example, into epoxy molding compounds. Furthermore, by using multiple staged polymerization, we also have found it possible to further improve the compatibility of silicone-containing polymers with polymers which are otherwise highly incompatible with silicone.

The crosslinked silicone-containing polymer particles prepared according to the process of the invention have been found to be useful as stress absorbers, at concentrations as low as about 1 weight percent, in molding compounds used to manufacture integrated circuits. Because the surface properties of the particles can be modified in a variety of ways, the particles are also useful as additives in coatings, textiles, caulks and adhesives for a variety of utilities such as for example, to improve block resistance, dirt pickup resistance, and high humidity resistance and the like.

The following examples are provided to illustrate the process of the invention and some advantages achieved with the polymers so produced in a number of applications. These examples are illustrative and do not, and should not, be construed as limiting the scope of the invention as modifications to the compositions illustrated hereinafter and the uses demonstrated are clear to those of ordinary skill in the art.

EXAMPLE 1

Preparation of Functionalized Organosiloxanes

This example describes the preparation of the functionalized organosiloxanes used in examples 2-8.

(a) Methacrylate-functional siloxane for examples 2-5.

A mixture of 378.5 grams of organohydrosiloxane [structure I, $m=6$, $R^1=R^2=R^x=$methyl, $n=180$], 21.5 grams of allyl methacrylate (inhibited with 200 parts per million of the monomethyl ether of hydroquinone (MEHQ), and 0.14 grams of a hydrosilylation catalyst (platinum-divinyl tetra-methyldisiloxane complex solution, 3.0 wt% in xylene) was stirred together at 25° C. for 1 hour. The temperature was then raised to 60° C. and held at that temperature for about 5 hours to complete the hydrosilylation reaction. The resulting functionalized organosiloxane (methacrylate - functional siloxane II, $m=6$, $R^1=R^2=R^x=$methyl, $n=180$) can be used for making crosslinked silicone rubber without further purification.

(b) Methacrylate-functional siloxane for example 8

A mixture of 130 grams of organohydrosiloxane (structure I, $m=8$, $R^1=R^2=$Hydrogen, $R^x=$methyl, $n=126$), 16.5 grams of ally methacrylate (inhibited with 200 ppm MEHQ) and 0.1 grams of platinum-divinyl tetramethyldisiloxane complex solution, 3.0 wt% in xylene) was stirred together at 25° C. for 1 hour. The temperature was then raised to 60° C. for about 3 hours to complete the hydrosilylation reaction. The resulting functionalized organosiloxane can be used for making crosslinked silicone rubber without further purification.

EXAMPLE 2

Preparation of Crosslinked Silicone-containing polymer Particle

A mixture of methacrylate-functional siloxane (example 1(a) (II, m=6, $R^1=R^2=R^x=$methyl, n=180, 95 g)), allyl methacrylate (5 g), Vazo 52 initiator (0.5 g), DS-4 surfactant (0.9 g), and water (30 g) was homogenized using a Ross Micro-Mixer Emulsifier at about 9,000 rpm for 3 minutes. The resulting emulsion, having a particle size in the submicron to 15 micron range, was poured into a 1 liter kettle containing hot water (200 g, 65° C.) to effect a suspension polymerization. After the mixture was held for 2 hours at 65° C., additional initiator t-BHP/SFS/Fe(II) redox system (0.2% based on total monomer) was added. The final latex was filtered and washed to give a dry powder having a particle size distribution similar to that of the monomer emulsion.

EXAMPLE 3

Submicron Size Crosslinked Silicone-containing polymer Particles

A mixture of methacrylate-functional siloxane (example 1 (a), 11, m=6, $R^1=R^2=R^x=$methyl, n=180, 95 g), ally methacrylate (5 g), ethyl acetate (233 g), Vazo 52 initiator (0.5 g), DS-4 surfactant (2.1 g), and water (100 g) was homogenized using a Ross Micro-Mixer Emulsifier at about 9,000 rpm for 3 minutes. The resulting emulsion, having a particle size in the 0.1 to 1.0 micron range, was poured into a 1 liter kettle containing hot water (70 g, 65° C.) to effect a suspension polymerization. After the mixture was held for 2 hours at 65° C., ethyl acetate was removed by stripping, and additional initiator t-BHP/SFS/Fe(II) redox system (0.2% based on total monomer) was added. The final latex was coagulated with an aqueous calcium nitrate solution (1.0 g calcium nitrate/10 g water), filtered and washed to give a dry powder having a particle size distribution similar to that of the monomer emulsion, as determined by microscopy.

EXAMPLE 4

Surface Modified Silicone-containing polymer Particles: Encapsulation

Siloxane Core./Isobornyl Methacrylate(IBOMA) Shell:

A mixture of methacrylate-functional siloxane (example 1 (a) II, m=6, $R^1=R^2=R^x=$methyl, n=180, 100 g), Vazo 52 initiator (0.5 g), DS-4 surfactant (0.9 g), and water (30 g) was homogenized using a Ross Micro-Mixer Emulsifier at about 9,000 rpm for 3 minutes. The resulting emulsion, having a particle size in the submicron to 15 micron range, was poured into a 1 liter kettle containing hot water (200 g, 65° C.) to effect a suspension polymerization. The mixture was held at 65° C. for 1 hour. To the resulting silicone seed was then gradually added an IBOMA monomer emulsion (25 g IBOMA, 0.12 g Vazo 52, 0.2 g DS-4, and 15 g water) over a period of 1 hour at 65° C. Additional initiator t-BHP/SFS/Fe(II) redox system (0.2% based on total monomer) was then added. The final latex was filtered and washed to give a dry powder having a particle size distribution similar to that of the monomer emulsion.

EXAMPLE 5

Surface Modified Silicone-containing polymer Particles: Reactive Surfactant

A mixture of methacrylate-funCtional siloxane (example 1(a), II, m=6, $R^1=R^2=R^x=$methyl, n=180, 90 g), allyl methacrylate (5 g), reactive surfactant MeO-$(EO)_{20}$—$(StO)_6$—$OCNHCH_2C$-$H_2$—$OOCC(CH_3)$=$CH_2$ (5 g), Vazo 52 initiator (0.5 g), DS-4 surfactant (0.9 g), and water (30 g) was homogenized using a Ross Micro-Mixer Emulsifier at about 9,000 rpm for 3 minutes. The resulting emulsion, having a particle size in the submicron to 15 micron range, was poured into a 1 liter kettle containing hot water (200 g, 65° C.) to effect a suspension polymerization. After the mixture was held at 65° C. for 2 hours, additional initiator with t-BHP/SFS/Fe(II) redox system (0.2% based on total monomer) was added. The final latex was filtered and washed to give a dry powder having a particle size distribution similar to that of the monomer emulsion.

EXAMPLE 6

Particle Size Distribution of Submicron Crosslinked Silicon Rubber Particles Submicron crosslinked silicone rubber prepared in example 3 had a particle size distribution from about 100 to 850 nanometers as determined by transmission electron microscopy. The mean particle size was 407 nanometers and the standard deviation was 141 nanometers.

EXAMPLE 7

Silicone-Containing Polymer Stress Absorber in Epoxy Novolac

This example demonstrates the usefulness of the crosslinked silicone rubber particles, prepared according to example 2 of the present invention, when used at 2 weight % in a commercial epoxy novolac molding formulation as compared to a control. The results indicate that the molding formulation containing the silicone rubber particles had significantly lower stress than the control. The following table shows the composition of the formulation and control used, and the performance properties of the molding formulations.

| Compound ID: | | |
|---|---|---|
| Ingredients and wt. %: | Example | Control |
| glycerol monostearate | 0.15 | 0.15 |
| carnauba wax | 0.18 | 0.18 |
| calcium stearate | 0.20 | 0.20 |
| carbon black | 0.25 | 0.25 |
| $Sb_2O_5$ (Na-free Nyacol) | 1.04 | 1.04 |
| Tetrabromobisphenol A (fire retardant) | 1.39 | 1.39 |
| Fumed silica | 1.00 | 1.00 |
| PE wax | 0.08 | 0.08 |
| Silane coupling agent | 0.40 | 0.40 |
| Benzyl dimethyl amine catalyst | 0.23 | 0.23 |
| Epoxy | 16.00 | 16.00 |
| Phenol Novolac | 7.83 | 7.83 |
| Fused silica | 34.74 | 36.74 |
| Fused silica | 32.51 | 34.51 |
| Silicone rubber (example 2) | 2.00 | 0.00 |
| Silicone oil (Dow-Corning) | 2.00 | 2.00 |
| TOTAL | 100.00 | 100.00 |

| PERFORMANCE PROPERTIES | Example | Control |
|---|---|---|
| Spiral flow (inches) (175 C - 1000 psig) | 26.3 | 33.0 |
| Hot hardness (Shore D) (175 C - 90 secs) | 70 | 76 |
| Ash (%) | 71.2 | 73.4 |
| Krass flash/bleed (mm) | | |
| 76.2 micron chan. | 6.26 | 10.26 |
| 50.8 micron chan. | 2.45 | 1.68 |
| 25.4 micron chan. | 2.12 | 1.07 |
| 12.7 micron chan. | 2.47 | 1.27 |
| Tg (C) | 152 | 150 |
| alpha-1 (ppm/C) | 20.8 | 19.6 |
| alpha-2 (ppm/C) | 73.2 | 69.3 |
| Flex. strength (Kpsi) | 17.0 | 20.4 |
| Flex. modulus (Mpsi) | 1.89 | 2.60 |
| Calc. stress (psi) | 5190 | 6620 |
| Rel. calc. stress (%) | 78 | 100 |

EXAMPLE 8

Suspension Polymerization of Functionalized Siloxane Without Comonomer or Extra Crosslinker A mixture of methacrylate- (example 1 (b), II, m=8, n=126, $R^1=R^2$=hydrogen, $R^x$=methyl, 100 g), Vazo 52 initiator (0.5 g) in ethyl acetate (2 g), DS-4 surfactant (0.9 g), and water (30 g) was homogenized using a Ross Micro-Mixer Emulsifier at about 9,000 rpm for 3 minutes. The resulting emulsion, having a particle size in the 1 to 15 micron range, was poured into a 1 liter kettle containing hot water (200 g, 65 degrees C.) to effect a suspension polymerization. After the mixture was held for 2 hours at 65° C., additional initiator t-BHP/SFS/Fe(II) redox system (0.2% based on total monomer) was added. The final latex was filtered and washed to give a dry powder having a particle size distribution similar to that of the monomer emulsion, as determined by microscopy.

EXAMPLE 9

Silicone Rubbers Dispersed in Phenol Novolac Resin

Silicone rubber powders prepared from example 2 and example 5 were mixed separately with a phenol novolac resin at 150° C. in 20 silicone rubber/80 phenol novolac weight ratio. The silicone rubber with surface modification showed better dispersion by microscopy. It also gave a lower melt viscosity for the mixture, 1.30E+2 poise vs. 1.03E+3 poise, at 139° C., as compared to the silicone rubber without surface modification.

What is claimed is:

1. A process for preparing spherical crosslinked silicone-containing polymer particles comprising:
   (a) forming an organosiloxane by hydrosilylation an organohydrosiloxane, containing at least two reactive silicon-hydrogen bonds per molecule, with a multifunctional unsaturated monomer in the presence of an effective amount of a hydrosilylation catalyst at a temperature of from about 25 C. to about 60 C., said multifunctional unsaturated monomer being unsaturated and reactive with said silicon-hydrogen bonds on said organohydrosiloxane while maintaining the ability after said reaction to be subsequently copolymerized in water and
   (b) polymerizing the organosiloxane with itself or with at least one other unsaturated monomer at a temperature from about 65 C. to about 95 C. to form said spherical crosslinked silicon-containing polymer particles.

2. The process of claim 1 further comprising homogenizing the functionalized organosiloxane of step (a) at a temperature in the range of from about 20° C. to about 60° C. before copolymerizing the homogenized functionalized organosiloxane in step (b).

3. The method of claim 1 further comprising isolating said spherical crosslinked silicone-containing polymer particles as a powder.

4. The spherical crosslinked silicone-containing polymer particles prepared according to the process of claims 2 or 3.

5. The process of claim 1 wherein said multifunctional unsaturated monomer used in the hydrosilylation reaction (a) is present at a molar excess to said organohydrosiloxane, and is selected from the group consisting of alkenyl and cycloalkenyl (meth)acrylates, maleates, and fumarates.

6. The process of claim 1 wherein said copolymerization step (b) is a suspension polymerization reaction conducted in an aqueous emulsion utilizing an ionic or nonionic surfactant and a free radical initiator having a ten hour half life below 100° C.

7. A process for preparing predominantly submicron size spherical, crosslinked silicone-containing polymer particles comprising:
   (a) forming an organosiloxane by hydrosilylating an organohydrosiloxane, containing at least two reactive silicon-hydrogen bonds per molecule, with a multifunctional unsaturated monomer in the presence of an effective amount of a hydrosilylation catalyst at a temperature of from about 25 C., said multifunctional unsaturated monomer being unsaturated and reactive with said silicon-hydrogen bonds on said organohydrosiloxane while maintaining the ability after said reaction to be subsequently copolymerized using a free radical initiator, and
   (b) suspension polymerizing the organosiloxane with itself or another free radical initiatable unsaturated monomer in an aqueous emulsion containing at least one cosolvent other than water at a concentration of from about 1 to about 99 weight percent on total organics, said cosolvent having a nonpolar solubility parameter in the range of from about 6.3 to about 7.4, a polar solubility parameter in the range of from about 3.1 to about 5.0, a hydrogen bonding solubility parameter in the range of from about 1.9 to about 4.6, and a total solubility parameter in the range of from about 7.8 to about 9.4.

8. The process of claim 6 comprising homogenizing the organosiloxane of step (a) in water at a temperature of from about 20° C. to about 60° C. before suspension copolymerizing the organosiloxane as in step (b).

9. The process of claim 7 wherein said cosolvent is employed at a concentration of from about 40 to about 80 weight percent on total organics.

10. The process of claim 7 wherein said cosolvent is selected from the group consisting of esters, ketones and aldehydes.

11. The process of claim 9 wherein said cosolvent is selected from the group consisting of ethyl acetate, butyl acetate, methyl propionate, ethyl acrylate, methyl acrylate, methyl methacrylate, butyl acrylate, vinyl acetate, methyl propyl ketone, methyl isopropyl ketone, diethyl ketone, hexanal, and isobutyraldehyde.

12. The process of claim 1 or claim 7 further comprising modifying the surface properties of the crosslinked silicone-containing polymer particles by sequential copolymerization of said particles with one or more copolymerizable monomers.

13. The process of claim 12 wherein said copolymerizable monomers are selected from the group consisting of methyl methacrylate, phenyl methacrylate, styrene, methylstyrene, butyl methacrylate, 2-ethylhexyl acrylate, butyl acrylate and isobornyl methacrylate.

14. The process of claims 1 or 6 further comprising modifying the surface properties of the crosslinked silicone-containing polymer particles by conducting the copolymerization step (b) in the presence of one or more reactive surfactants.

15. The process of claim 14 wherein said reactive surfactants are selected from the group consisting of nonylphenoxypoly(ethyleneoxy)ethyl acrylate, methoxypoly(ethyleneoxy)ethyl acrylate, and stearyl-poly(ethyleneoxy)ethyl acrylate, where said ethyleneoxy chains contain from about 10 to about 40 units.

16. The process of claim 14 wherein said modification of the surface properties of the crosslinked silicone-containing polymer particles further comprises sequentially copolymerizing said crosslinked silicone-containing polymer particles containing said reactive surfactants with one or more copolymerizable monomers.

17. A method of incorporating a crosslinked silicone-containing polymer prepared according to the process of claim 1 or claim 7 at a concentration of at least about 1 percent by weight into a molding formulation.

18. A process for preparing a non-crosslinked silicone-containing polymer comprising:
  (a) forming a functionalized organosiloxane by hydrosilylating a monohydrosiloxane with a multifunctional unsaturated monomer in the presence of an effective amount of a hydrosilylation catalyst, said multifunctional unsaturated monomer being unsaturated and reactive with said silicon-hydrogen bonds on said organohydrosiloxane while maintaining the ability after said reaction to be subsequently copolymerized, and
  (b) copolymerizing said functionalized organosiloxane with at least one alpha, beta-ethylenically unsaturated monomer to form the non-crosslinked silicone-containing polymer.

19. The non-crosslinked silicone polymer prepared according to claim 18.

20. A film forming coating comprising the non-crosslinked silicone-containing polymer prepared according to claim 18.

* * * * *